United States Patent [19]

Oka et al.

[11] Patent Number: 4,898,775

[45] Date of Patent: Feb. 6, 1990

[54] PAINT COATED METAL SHEETS

[75] Inventors: Joji Oka; Ryoji Nishioka, both of Kanagawa, Japan

[73] Assignee: Nippon Steel Corporation, Tokyo, Japan

[21] Appl. No.: 349,934

[22] Filed: May 8, 1989

Related U.S. Application Data

[63] Continuation of Ser. No. 141,955, Jan. 11, 1988, abandoned, which is a continuation-in-part of Ser. No. 120,776, Nov. 16, 1987, abandoned, which is a continuation of Ser. No. 856,160, Apr. 25, 1986, abandoned.

[30] Foreign Application Priority Data

| | | | |
|---|---|---|---|
| Apr. 27, 1985 | [JP] | Japan | 60-89933 |
| Apr. 22, 1986 | [AU] | Australia | 56486/86 |
| Apr. 25, 1986 | [CA] | Canada | 507657 |

[51] Int. Cl.$^4$ ........................ B32B 15/08; B32B 27/06

[52] U.S. Cl. .................................... 428/336; 428/421; 428/422; 428/463

[58] Field of Search ............... 428/463, 422, 421, 457, 428/336, 409; 106/14.5

[56] References Cited

U.S. PATENT DOCUMENTS

| | | | |
|---|---|---|---|
| 4,045,416 | 8/1977 | Robson et al. | 428/457 |
| 4,557,977 | 12/1985 | Memmer et al. | 428/463 X |
| 4,600,651 | 7/1986 | Aufdermarsh et al. | 428/463 X |

FOREIGN PATENT DOCUMENTS

| | | | |
|---|---|---|---|
| 59-169851 | 9/1984 | Japan | 428/463 |

OTHER PUBLICATIONS

Ayusawa et al., "3-coat 3-bake Pre-coated Steel Sheet", Practical Surface Technique, vol. 30, No. 8 (1983), p. 358.

*Primary Examiner*—Thomas J. Herbert
*Attorney, Agent, or Firm*—Cushman, Darby & Cushman

[57] ABSTRACT

Paint coated metal sheets are provided by applying a paint film on a metal sheet wherein the paint film has a surface layer having a thickness of one-5000 angstroms. The paint film contains fluorine atoms and/or perfluoralkyl groups such as methyl fluoride, ethyl fluoride, the fluorine atoms and/or perfluoralkyl groups being introduced in the paint film by a plasma treatment.

3 Claims, 5 Drawing Sheets

ESCA SPECTRA OF PAINT COATED STEEL SHEET OF EXAMPLE 6

(a) BEFORE PLASMA TREATMENT (b) AFTER PLASMA TREATMENT

ESCA $C_{1s}$ SPECTRA AND WAVE DECOMPOSITION OF PAINT COATED STEEL SHEET OF EXAMPLE 6
(a) BEFORE PLASMA TREATMENT
(b) AFTER PLASMA TREATMENT

FLUORINATION BY PLASMA TREATMENT

PAINT COATED METAL SHEETS

This is a continuation of application No. 07/141,955, filed Jan. 11, 1988, which was abandoned, which in turn is a continuation of Ser. No. 07/120,776, filed 11/16/87, which in turn is a continuation of Ser. No. 06/856,160 filed 4/25/86, all abandoned.

BACKGROUND OF THE INVENTION

1. Field of the Invention

The present invention relates to paint coated metal sheets comprising applying a paint film on a metal sheet, said paint film having a surface layer with a thickness of 1–5000 Å containing fluorine atoms as a perfluoroalkyl group such as methyl fluoride, ethyl fluoride and so on introduced therein by a plasma treatment.

2. Description of the Related Art

Up to now, paint coated metal sheets have been widely used in various applications including buildings, automobiles, electric appliances and so on, and the main qualities required in these fields of application are to maintain a beautiful surface appearance and to assure good corrosion resistance.

As most of the paint coated metal sheets are subjected to mechanical working after the paint coating, the primary requirements of the paint film on the metal sheet are good adhesion, and good workability, particularly press formability, and the secondary requirements are good corrosion resistance, permanent color and brightness, stain resistance, and so on depending on the final applications of the products. In addition to the above requirements, it is also essential for the paint coated metal sheets that the paint film on the substrate will not be damaged during the mechanical working, especially press forming.

Once damaged, the paint film can no more function as barrier against corrosion, and the corrosion is caused and expands from where the substrate is exposed due to the damage of the paint film, thus markedly shortening the service life of the buildings, automobiles, electric appliances and so on, in which the paint coated metal sheets are used.

Of the paint coated metal sheets, the so-called "precoated thin metal sheet" in particular, which is nowadays used in roofings, automobiles and electric appliances, is subjected to severe working, especially press forming, and must show a relatively good elongation property of the paint film on the metal sheet. However, paint films which satisfy the required elongation property are generally soft so that they are easily damaged and poor in the strain resistance. This incompatibility has long been a problem.

In recent years, as proposed in "Practical Surface Technics" (Jitsumu Hyomen Gijutsu), Vol 30, page 358, 1983, studies have been made on production of paint coated steel sheets having excellent paint film properties by application of the so-called "three-coat system by roll-coating" according to which an undercoating for improving the adhesion with the metal substrate, an intermediate coating for improving the workability and a top coating for assuring the surface hardness are applied on the metal substrate. This three-coat system, however, has a problem that it is technically difficult to maintain the top coat layer to a thickness less than 3 microns so that the hardness of the top coat layer deteriorates the good workability of the intermediate paint coat layer, hence it is very difficult to satisfactorily balance the incompatibility between the surface hardness and the workability which are originally sought for. This is a vital defect of the roll coating method.

Also, Japanese Laid-Open Patent Application No. Sho 59-169851 discloses "a pre-coated steel sheet precoated with polyvinyl chloride dispersion paint", according to which an ultraviolet ray curing type clear paint is applied on the polyvinyl chloride dispersion paint applied on the steel substrate and is cured by ultraviolet rays in order to prevent damages of the paint film during the forming of the pre-coat sheet. According to this prior art, the thickness of the ultraviolet ray curing type clear paint is as thick as 200 μ and this method has been limitedly applied to the polyvinyl chloride dispersion paint pre-coated steel sheets.

Further, it is known to fluorinate the surface of polymers by a plasma treatment. For example, according to the report by M. Anand et al. (Polymer, 361, Vol. 22, 1981), the surface of low-density polyethylene is fluorinated by using a mixture gas of carbon tetrafluoride, or fluorine and helium. The fluorination of the surface of polymer in this case is only for the purpose of rendering the polymer surface hydrophobic by introducing fluorine atoms into the surface layer of polyethylene. Therefore, this prior art is completely different from the present invention with respect to the technical object as described hereinbelow.

Also, it is known in the field of optical lenses and filters to apply a fluorine coating for the purpose of reducing the refractive power or preventing the reflection, and in the field of blood backs it is known to apply the same for the purpose of preventing the dissolution of plasticizers from the back material of polyvinyl chloride resin.

SUMMARY OF THE INVENTION

Therefore, the present invention is to provide paint coated metal sheets, which are remarkably improved in the hardness of paint film, or in the susceptibility to damages, while maintaining excellent workability, adhesion and corrosion resistance which are inherently possessed of by the paint film by fluorinating the surface layer of the paint films such as acryl and polyester paint films applied on metal substrates.

The conventionally known fluorination of the surface of resin articles is completely different from the fluorination of the surface of paint coated metal sheets with respect to the object and results of the plasma treatment despite the similarity in the chemical reaction on the surface of organic substances. For example, in the case of pre-coated steel sheets, in order to satisfy the requirement of workability, soft and expandable resins are normally used for the paint coating, but this type of resins are easily damaged and has a very poor stain resistance.

The inventiveness of the present invention is based on the discovery that when the pre-coated metal sheets having the above defects are subjected to the surface fluorination by a plasma treatment, they are converted into new pre-coated metal sheets which are highly resistive against the damages and stain and yet enjoy the inherent high workability.

The above technical advantages obtained by the surface fluorination by a plasma treatment can be remarkable and significant only when the surface fluorination is applied to the pre-coated metal sheets, particularly, steel sheets coated with paint. This is completely different from the surface quality modification of plastic articles of high molecular materials.

The surface fluorination of paint coated metal sheets, according to the present invention is produced by a process comprising applying a conventional type of paint having excellent adhesion, workability, and corrosion resistance on a metal sheet, curing the paint, and subjecting the surface portion, for example 1-5000 Å depth, of the paint film on a metal sheet to fluorination by the use of a gas plasma of carbon tetrafluoride, ethane hexafluoride, perfluoropropane, a mixture of fluorine and hellium and so on.

By the surface fluorination, the surface portion of the paint film is subjected to the reaction schematically shown in FIG. 4 as will be shown hereinafter.

As illustrated, not only fluorine atoms are introduced, but also a perfluoroalkyl group is introduced, although the introduction of fluorine atoms only is effective for the desired results. Regarding the degree of the fluorination required for the desired result, any fluorination which can be detected by ESCA analysis is sufficient.

For example, in using a paint containing fluorine for applying a paint film on a steel sheet conventionally, since all over the paint film contains fluorine atom uniformly as shown in FIG. 5, while the resistance against staining may be good, the workability is obviously inferior. In contrast to this, as shown in FIG. 6, the present invention is to fluorinate only the uppermost surface part of a paint film comprising, for example, polyester having originally excellent workability by introducing methyl fluoride, ethyl fluoride and the like thereto. Thus, the surface characteristics of a paint film applied on a metal sheet such as the corrosion resistance against staining can be improved remarkably by maintaining its proper excellent workability. A paint coated metal sheet particularly a steel sheet having such a specified construction and effect can by no means be obtained by a method other than the present invention.

DETAILED DESCRIPTION OF THE INVENTION

The present invention will be described in details hereinbelow.

Regarding the paint usable in the present invention, there is no special limitation with respect to the type or nature, and any conventional paints, such as of polyester, epoxy, vinyl, alkyd, uretane, silicone and the like, may be used. These paints are applied on a metal sheet as desired.

As the gas used for surface fluorination of the paint film on the metal sheets, fluorine, or compounds in the gas form containing fluorine atoms in their molecules, such as carbon tetrafluoride, ethane hexafluoride, perfluoropropane, and so on or their mixtures with inert gas, such as argon, helium and nitrogen, may be used.

The metal sheets used as a substrate in the present invention may be thin sheets.

Also, there is no special limitation with respect to the kinds or grades of the metal sheets used in the present invention, and steel sheets as cold rolled or hot rolled, similar steel sheets further coated with zinc, aluminum, tin, nickel, copper, cobalt, iron, and other metals, their alloys, or their composite materials, and further, aluminum plates, titanium plates and their alloy plates similarly coated may be satisfactorily used.

Hereinbelow, the process for producing fluorinated paint coated metal sheets according to the present invention will be described.

As for the generation of plasma, there are three types of methods: an inner electrode type, a non-electrode type, and a micro-wave type. Any of these types can be used in the present invention.

Figure 1:
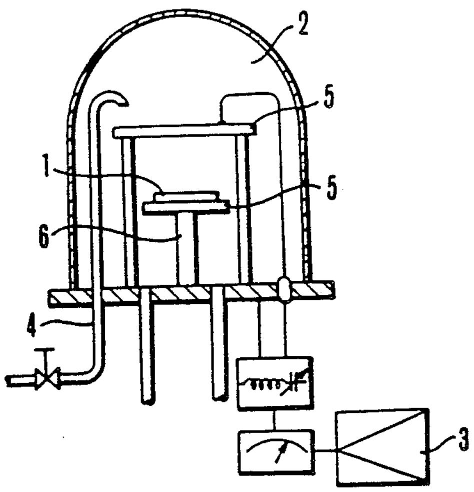
FIG. 1 shows schematically an inner electrode type plasma apparatus for fluorination used in the present invention.

When the surface fluorination is done by using an inner electrode type apparatus with the use of a radio frequency (13.56 MHz) power source (3) as illustrated in FIG. 1, the pre-paint coated metal sheet (1) is placed in a reactor (2) in which a vacuum of $10^{-3}$ Torr is maintained, and then the gas as mentioned before is introduced into the reactor through a conduct pipe (4) to a predetermined gas pressure (about 0.01 to 1 Torr). Then an appropriate discharge power (30 to 400 W) is added to the electrodes (5) for effecting the surface fluorination of the paint coated metal sheet placed on the electrode supported by the metal stool (6).

Figure 2:
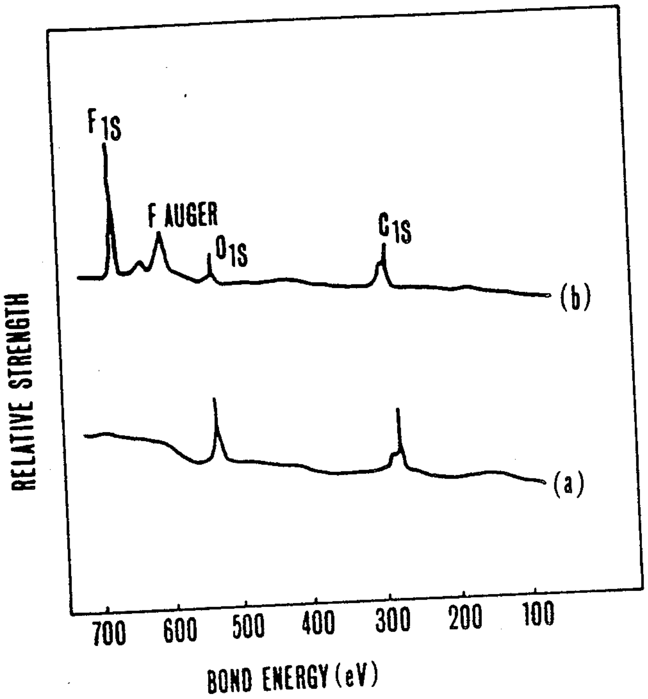
FIG. 2 shows the result of ESCA spectra of the hardness of the paint film before and after the plasma treatment.
Figure 3:
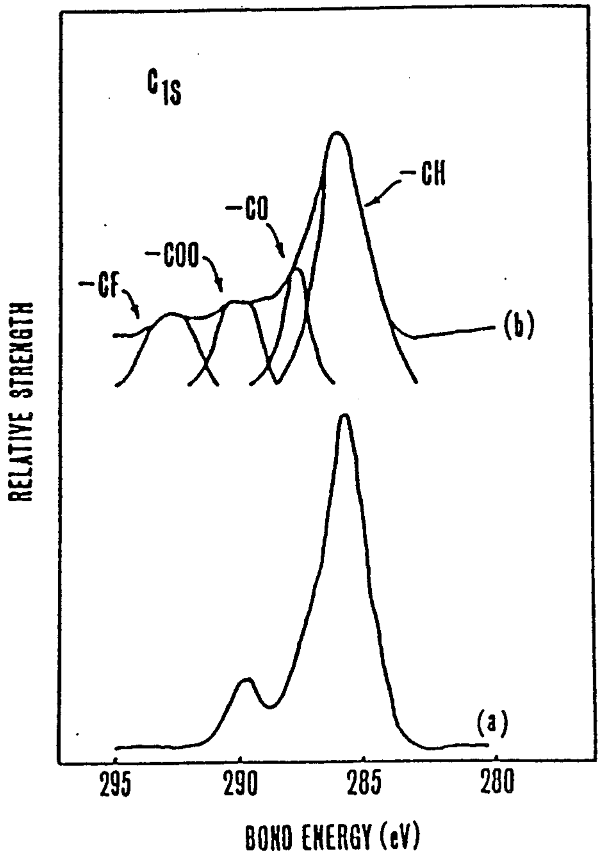
FIG. 3 shows the result of ESCA $C_{1S}$ spectra and wave decomposition of the paint film before and after the plasma treatment.
Figure 4:
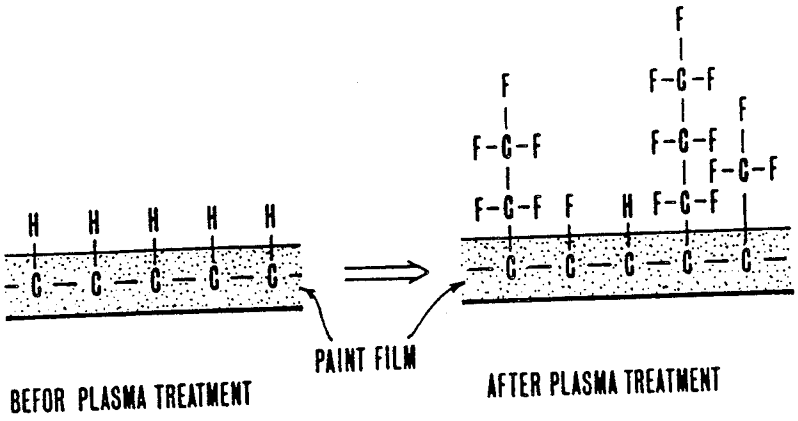
FIG. 4 shows schematically the fluorination reaction of the surface of the paint film.
Figure 5:
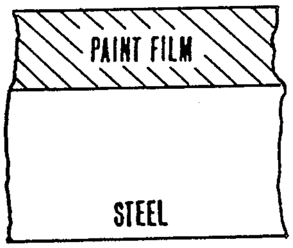
FIG. 5 shows the section of a conventional paint coated metal sheet in which the paint is containing fluorine.
Figure 6:
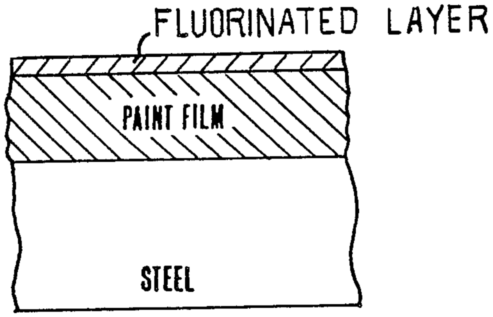
FIG. 6 shows the section of the present inventive paint coated metal sheet having thin fluorinated layer at the uppermost surface of the paint film.

The degree of the fluorination of the surface portion of the paint film can be varied by selecting the types of gas or gas mixing ratio and the discharge condition and these factors are controlled depending on the final applications of the paint coated metal sheet. The surface fluorination can be confirmed by the Fourier transform infrared spectrochemical analysis (FT-IR) and the X-ray photoelectron spectrochemical analysis (ESCA). As illustrated by the analysises by ESCA in FIGS. 2 and 3, the fluorination reaction on the surface portion of the paint film is understood as schematically shown in FIG. 4. The resultant paint coated metal sheets, whose surface portion of the paint film being fluorinated, show remarkable improvements in the hardness or the resistance to the scratches of the paint film layer while maintaining the inherent excellent properties such as paint adhesion, workability and corrosion resistance.

The paint coated metal sheets according to the present invention have remarkable advantages that the surface hardness of the paint film, resistance to damages, as well as stain resistance are markedly improved without lowering the excellent properties inherent to the paint film by introduction of fluorine or a perfluoroalkyl group such as methyl fluoride, and ethyl fluoride into the surface portion of the paint film. Therefore, the paint coated metal sheets according to the present invention are very useful as a pre-coated metal sheet for roofings, walls, automobiles and electric appliances, and can greatly contributed to elongate the service life thereof.

DETAILED DESCRIPTION OF THE PREFERRED EMBODIMENTS

The present invention will be better understood from the following descriptions of preferred embodiments, but should not be limited thereto.

EXAMPLE 1

A steel sheet (0.6×100×100 mm) was coated with a primer coat of epoxy resin in 5 μ thickness and a top coat of polyester in 20 μ thickness and baked, and its surface was fluorinated by using a gas plasma of carbon tetrafluoride under the conditions:

| | |
|---|---|
| Gas flow rate | 50 cm$^3$ (STP)/min. |
| Gas pressure | 0.5 Torr |
| Discharge power | 40 W |
| Discharge time | 5 minutes |

The paint film qualities of the resultant paint coated steel sheets as fluorinated were determined by the pencil hardness test (JIS K-5400, 6.14 for breaking and scratching), the 180° bending test and the stain test. As obvious from Table 1, the result shows that the hardness of the paint film is remarkably improved with no deterioration of workability by the surface fluorination with the use of the plasma treatment.

EXAMPLE 2

A pre-coated steel sheet (0.6 mm in thickness, 100 mm in width 100 mm in length) was prepared by applying a primer coat of polyester in 5 μ thickness and a top coat of polyester in 20 μ thickness onto a galvanized steel sheet (20 g/m$^2$ of zinc coat) and baking the paint film. The surface of this pre-coated steel sheet was fluorinated by using a gas plasma of ethane hexafluoride under the following conditions:

| | |
|---|---|
| Gas flow rate | 3–10 cm$^3$ (STP)/min. |
| Gas pressure | 0.035 Torr |
| Discharge power | 300 W |
| Discharge time | 5 seconds |

The paint film qualities of the resultant paint coated galvanized steel sheet were determined by the pencil hardness test (JIS K-5400, 6.14), the 180° bending test and the stain test. As shown in Table 1, the results of the tests reveal that the hardness and the resistance to stain are remarkably improved without sacrifice of the workability.

EXAMPLE 3

A primer coat of epoxy-type alkyd resin paint in 5 μ was applied on the surface of a zinc-nickel alloy galvanized steel sheet (0.8 mm in thickness, 100 mm in width and 100 mm in length; alloy coat of 20 g/m$^2$) and baked, a top coat of urethan-type resin paint was applied in 20 μ thereon and baked again, and the surface of this colored galvanized steel sheet was fluorinated by using a gas plasma of 6% fluorine—94% helium under the following conditions:

| | |
|---|---|
| Gas flow rate | 40 cm$^3$ (STP)/min. |
| Gas pressure | 0.5 Torr |
| Discharge power | 50 W |
| Discharge time | 1 minute |

The paint film qualities of the resultant colored zinc-nickel alloy plated steel sheet were determined by the pencil hardness test (JIS K-5400, 6.14), the 180° bending test and the stain test.

As shown in Table 1, the results show that the hardness and the resistance to stain are remarkably improved without lowering the workability.

TABLE 1

| | | Evaluation of Paint Film Qualities | | | | | |
|---|---|---|---|---|---|---|---|
| | | Pencil Hardness Test*1 | | Workability | | Strain Resistance*2 | |
| | Gas | Before Treatment Breaking/ Scratching | After Treatment Breaking/ Scratching | Before Treatment (20° C.) | After Treatment (20° C.) | Before Treatment Red/Black | After Treatment Red/Black |
| Example 1 | $CF_4$ | 2H/F | 4H/2H | 0T | 0T | Δ/○ | ◎/◎ |
| Example 2 | $C_2F_6$ | H/HB | 3H/H | 0T | 0T | X/X | ◎/◎ |
| Example 3 | 6% Fe—94% He | 3H/H | 6H/3H | 1T | 1T | Δ/○ | ◎/◎ |

*1 The breaking in the pencil hardness test was done in accordance with JIS K-5400, 6.14

*2 Determined by marking with magic ink (red and black) and wiping off with ethanol after 24 hours.

What is claimed is:

1. A paint coated metal sheet comprising a metal substrate and a paint film applied thereon, the uppermost surface part of said paint film containing fluorine atoms introduced thereinto as perfluoroalkyl groups including methyl fluoride and ethyl fluoride said perfluoroalkyl groups being introduced into said surface up to a depth of 1–5000 Å by a plasma treatment, with the remaining part of said paint film being non-fluorinated by said plasma treatment.

2. A paint coated metal sheet according to claim, 1, wherein said plasma treatment employs a gas plasma such as carbon tetrafluoride, ethane hexafluoride, perfluoropropane and a mixture of fluorine and helium.

3. A paint coated metal sheet according to claim 1, in which the metal substrate is a zinc plated steel sheet or a zinc alloy plated steel sheet.

* * * * *